United States Patent [19]
Wilkins et al.

[11] Patent Number: 5,356,532
[45] Date of Patent: Oct. 18, 1994

[54] USE OF A MULTI-APERTURED PLASTIC PIPE IN THE DRIVE AND STRUCTURE OF A ROTARY SELF-CLEANING STRAINER

[75] Inventors: Thomas R. Wilkins; Charles A. Wilkins; James O. Stoneburner, all of Ann Arbor, Mich.

[73] Assignee: Perfection Sprinkler Co., Ann Arbor, Mich.

[21] Appl. No.: 46,761

[22] Filed: Apr. 13, 1993

[51] Int. Cl.⁵ .................................. B01D 33/073
[52] U.S. Cl. ........................... 210/107; 210/161; 210/391; 210/409; 210/512.1
[58] Field of Search ............... 210/157, 158, 161, 174, 210/360.2, 365, 380.1, 383, 391, 407, 409, 411, 412, 512.1, 512.3, 402, 107, 108

[56] References Cited

U.S. PATENT DOCUMENTS

| | | | |
|---|---|---|---|
| 3,616,914 | 11/1971 | Reid | 210/107 |
| 3,750,885 | 8/1973 | Fournier | 210/107 |
| 4,261,822 | 4/1981 | Richardson | 210/107 |
| 4,822,486 | 4/1989 | Wilkins et al. | 210/412 |
| 5,108,592 | 4/1992 | Wilkins et al. | 210/107 |
| 5,183,568 | 2/1993 | Lescovich | 210/380.1 |
| 5,215,656 | 6/1993 | Stoneburner | 210/412 |

Primary Examiner—Thomas Wyse
Attorney, Agent, or Firm—George L. Boller

[57] ABSTRACT

A cylindrical plastic pipe is used as the sidewall of the rotary portion of the strainer. Apertures are drilled radially through the pipe, and one or more screen assemblies are circumferentially wrapped around the outside of and removably fastened to the pipe to cover the apertures. The central core of the strainer contains both supply and suction pipes. The supply pipe feeds cleaning and drive nozzles that are aimed at the pipe apertures. The cleaning nozzles are aimed radially for cleaning certain apertures. The drive nozzles are aimed tangentially toward a circumferential succession of other apertures near the bottom of the pipe to drive the rotary portion. In one embodiment the drive nozzles can rotate the rotary portion in either direction.

20 Claims, 7 Drawing Sheets

USE OF A MULTI-APERTURED PLASTIC PIPE IN THE DRIVE AND STRUCTURE OF A ROTARY SELF-CLEANING STRAINER

Field of the Invention

This invention relates to a rotary self-cleaning strainer.

BACKGROUND AND SUMMARY OF THE INVENTION

When water is to be pumped out of an outdoor pit, reservoir, or canal, it is important to prevent debris, such as leaves, sticks, discarded plastic and paper articles, stones, etc., from entering the pump. Rotary self-cleaning strainers that contain cylindrical screens for performing the straining function are often used for this purpose.

The strainer is attached to the end of a conduit and placed in the body of water that is to be pumped. The pump is operated to suck water through the strainer and conduit, as the strainer screen prevents debris from being sucked into the conduit along with the water. Certain debris may adhere to the screen's exterior due to the pump suction force. However, the continued adherence of such debris to the screen's exterior, and resulting impairment of flow through the screen, is prevented by rotating the screen past a nozzle structure which is disposed on the interior of the screen and directs water outwardly through the screen to dislodge the debris. The water is fed under pressure to the strainer through a separate supply line which may be tapped into the pump's outlet. The water acts on only a limited circumferential zone of the screen at any given time to force adhering debris away from the exterior of the screen as the screen revolves past the nozzle structure. The remainder of the screen serves to pass the flow of water that is being sucked by the pump.

Commonly assigned U.S. Pat. Nos. 4,822,486 and 5,108,592 disclose new and improved rotary self-cleaning strainers of this general type. The patented strainers possess a number of novel and unique features which individually and collectively relate to the patented improvements. One feature relates to the use of the nozzles to simultaneously both rotate and clean the screen. In order to do this each nozzle is aimed such that it emits pressurized water that has both a tangential and a radial component of velocity at its reaction point on the screen. The screen is a perforated aluminum sheet that encloses the circumference of a spool-like frame.

Continuing efforts by the assignee have resulted in further improvements in rotary self-cleaning strainers, and they are the subject of the present patent application. One improvement relates to the use of a multi-apertured cylindrical plastic pipe in the rotary portion of the strainer. One purpose of this pipe is to provide support for the strainer screen which is wrapped around the circumference of the pipe. Another is to provide reaction surfaces against which drive nozzles emit pressurized water to rotate the rotary portion of the strainer.

The reaction surfaces are provided by a circumferentially extending succession of relatively small apertures, or holes, that extend through the sidewall of the pipe. One or more drive nozzles at a particular circumferential location, or locations, is, or are, aimed at this succession of apertures to direct pressurized water toward the succession of apertures with velocity that acts predominantly tangentially of the strainer axis at reaction points with the apertures. The pressurized water acts on portions of the surface area of each aperture that more or less face the drive nozzle(s). The apertures are spaced sufficiently close together that circumferential motion that is imparted to the pipe by virtue of the drive nozzle(s) acting on a particular one or ones of the apertures produces a sufficient amount of circumferential motion that an immediately succeeding aperture or apertures comes under the influence of the drive nozzle(s) whereby continuing rotation is imparted to the rotary portion of the strainer.

Other larger apertures, or holes, in the sidewall of the pipe provide for the water being pumped to pass into the interior of the pipe while the overlying strainer screen strains debris from it. Since the suction force developed by the pump is typically large enough that the debris may tend to adhere to the outside of the screen, the strainer also includes one or more cleaning nozzles aimed at these other larger apertures to dislodge such adhering debris. Because the rotary drive force is being efficiently imparted by the drive nozzle(s) acting on the smaller apertures, the cleaning nozzle(s) may be aimed substantially radially outwardly as viewed along the axis of the strainer to take advantage of maximum debris-dislodging force. Thus the cleaning nozzle(s) is (are collectively) incapable of imparting rotation to the rotary portion of the strainer.

In one embodiment of strainer, the drive nozzle(s) is (are) arranged to produce only uni-directional rotation of the rotary portion of the strainer. In another embodiment, drive nozzles are arranged to produce bi-directional rotation, meaning that the rotary portion can be rotated in one direction and then reversed. Such a reversing feature may be desirable for certain strainer constructions and/or strainer applications.

The strainer that will be illustrated in the accompanying drawings is designed for only partial submersion in a body of water, as distinguished from complete immersion. Broader principles of the invention are however also applicable to strainers that are intended to be completely submerged in water.

A further feature that guards against excessive suction that might otherwise detrimentally collapse the strainer screen into the apertures in the pipe's sidewall is in the nature of a vacuum relief valve.

One of the advantages of the invention is that the strainer screen can be a woven stainless steel wire mesh screen. The ability to use this medium for the strainer provides potential cost economies and service advantages. To provide for convenient assembly and disassembly of the strainer screen to and from the pipe, wherever and whenever needed, the woven wire mesh is backed with a sheet of plastic backing that affords some rigidity, yet can be wrapped along with the woven wire mesh around the outside of the pipe. The plastic backing sheet is apertured in the same pattern as the apertures in the sidewall of the pipe so that when wrapped around the pipe, the apertures in the two parts are in registry. The woven wire mesh and the backing sheet are held together by means of U-shaped channel that is fitted over the common perimeter margin of the two when they are placed together with their apertures in registry. This then forms an assembly that is secured to the pipe by means of screws that pass through the assembly at various locations around its perimeter margin just inwardly of the channel to thread into the sidewall of the pipe. The channel provides a seal of the perimeter margin of the assembly to the pipe when the assembly is completely fastened to the outside of the pipe.

Annular end closure discs close the opposite axial ends of the multi-apertured pipe to the non-rotating central core of the strainer which comprises a suction pipe and a supply pipe. These end closure discs are rigid plastic, and when their perimeters are fastened to the axial ends of the multi-apertured pipe, a strong structural foundation for the rotary portion of the strainer results. These annular end closure discs include means providing for the journaling of the rotary portion of the strainer on the central core about the strainer's longitudinal axis. Because of the use of the cylindrical plastic multi-apertured pipe as part of the combination with these end closure discs, there is no need for any additional structure to extend longitudinally between the annular discs. This has the advantage of eliminating the tie rod structures that are present in the strainers of the aforementioned commonly assigned patents to join the annular end closure discs. The construction of the present invention also offers the advantage of being able to replace screen without having to disassemble any of the underlying screen support structure.

The foregoing features and advantages of the invention, along with additional ones, will be seen in the ensuing description and claims which are accompanied by drawings. The drawings disclose a presently preferred embodiment of the invention according to the best mode contemplated at this time for carrying out the invention.

DESCRIPTION OF THE PREFERRED EMBODIMENT

Figure 1:
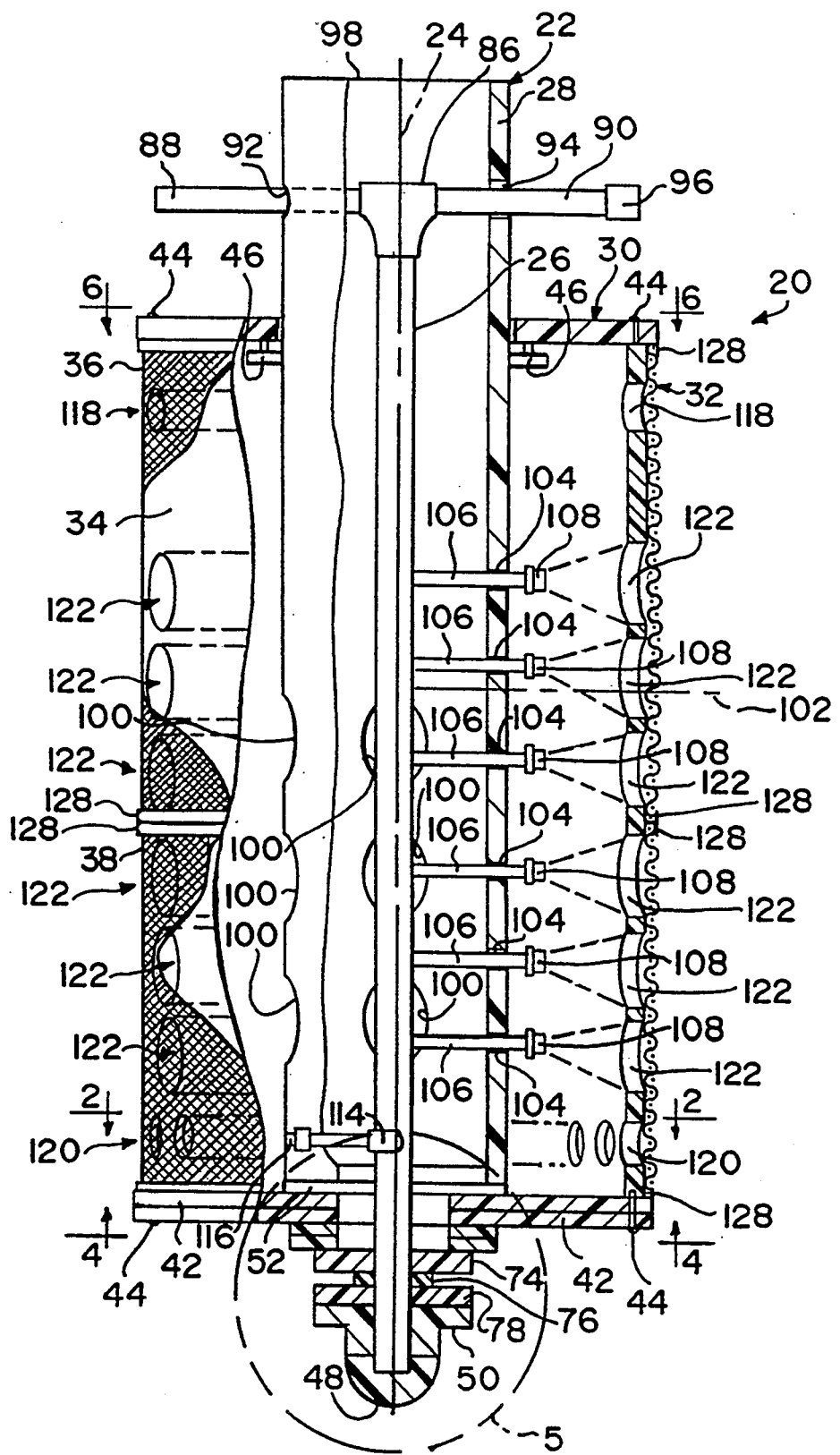
FIG. 1 is a longitudinal view, partly in cross section through a rotary self-cleaning strainer embodying principles of the invention.

FIGS. 1-6 present the general organization and arrangement of a rotary self-cleaning strainer 20 embodying principles of the invention. Strainer 20 comprises a central core 22 that has a longitudinal axis 24 and comprises a smaller diameter cylindrical supply pipe 26 and a larger diameter cylindrical suction pipe 28 that are coaxial with axis 24. Core 22 is a stationary portion of strainer 20 on which a rotary portion 30 of strainer 20 is journaled for rotation about axis 24.

Rotary portion 30 comprises a pipe-strainer screen combination assembly 32 which includes a cylindrical main pipe 34 and two strainer screen assemblies 36 and 38 wrapped fully about and removably fastened to the circumference of main pipe 34. While two assemblies 36 and 38 are used in the illustrated embodiment, the actual number used in any given embodiment of strainer may depend on certain factors such as the size of main pipe 34, or the size of available strainer screen material for fabricating the assemblies.

Rotary portion 30 further includes two annular end closure discs 40 and 42, each securely attached to a respective axial end of main pipe 34 and extending radially inwardly from main pipe 34 to central core 22. The attachment of these discs to the main pipe may be accomplished by passing the shanks of a number of headed screws 44 through holes in the outer perimeter margin of each disc and threading the screw shanks into holes in the ends of main pipe 34 thereby drawing the discs tight against the ends of the main pipe. The discs and main pipe have sufficient thickness to provide a sturdy structural framework for rotary portion 30.

Journaling of rotary portion 30 on central core 22 is accomplished as follows. On the interior face of disc 40 proximate its I.D. are mounted a series of identical diameter wheels 46 that can rotate about axes that are parallel with axis 24. There are four such wheels spaced at ninety degree intervals about axis 24 in the illustrated embodiment. The wheels define a circle that is concentric with axis 24 and slightly smaller than the I.D. of disc 40 such that the wheels just touch the O.D. of suction pipe 28. This arrangement journals one axial end of the rotary portion on the central core.

Figure 5:
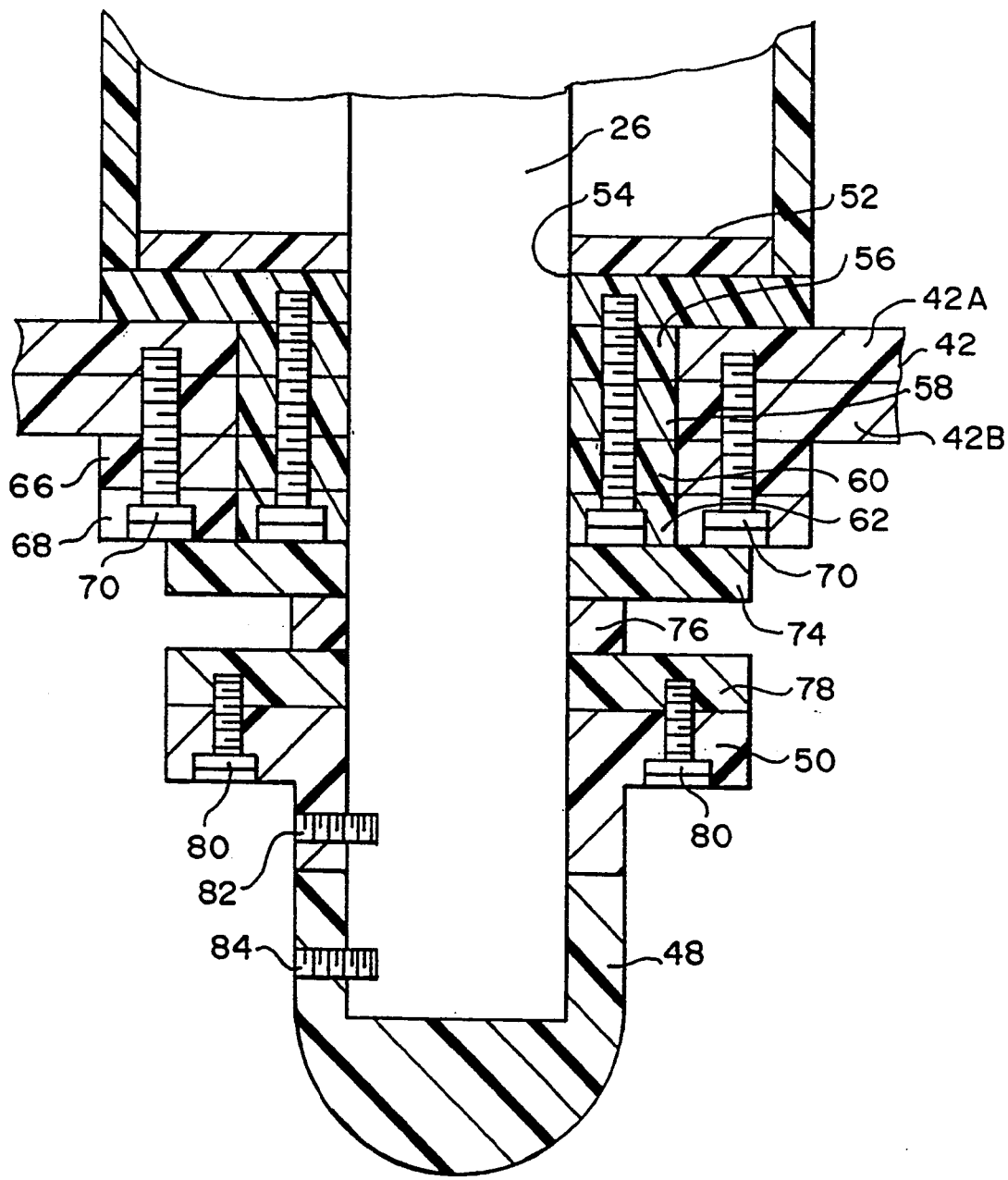
FIG. 5 is an enlarged view in circle 5 in FIG. 1.
Figure 7:
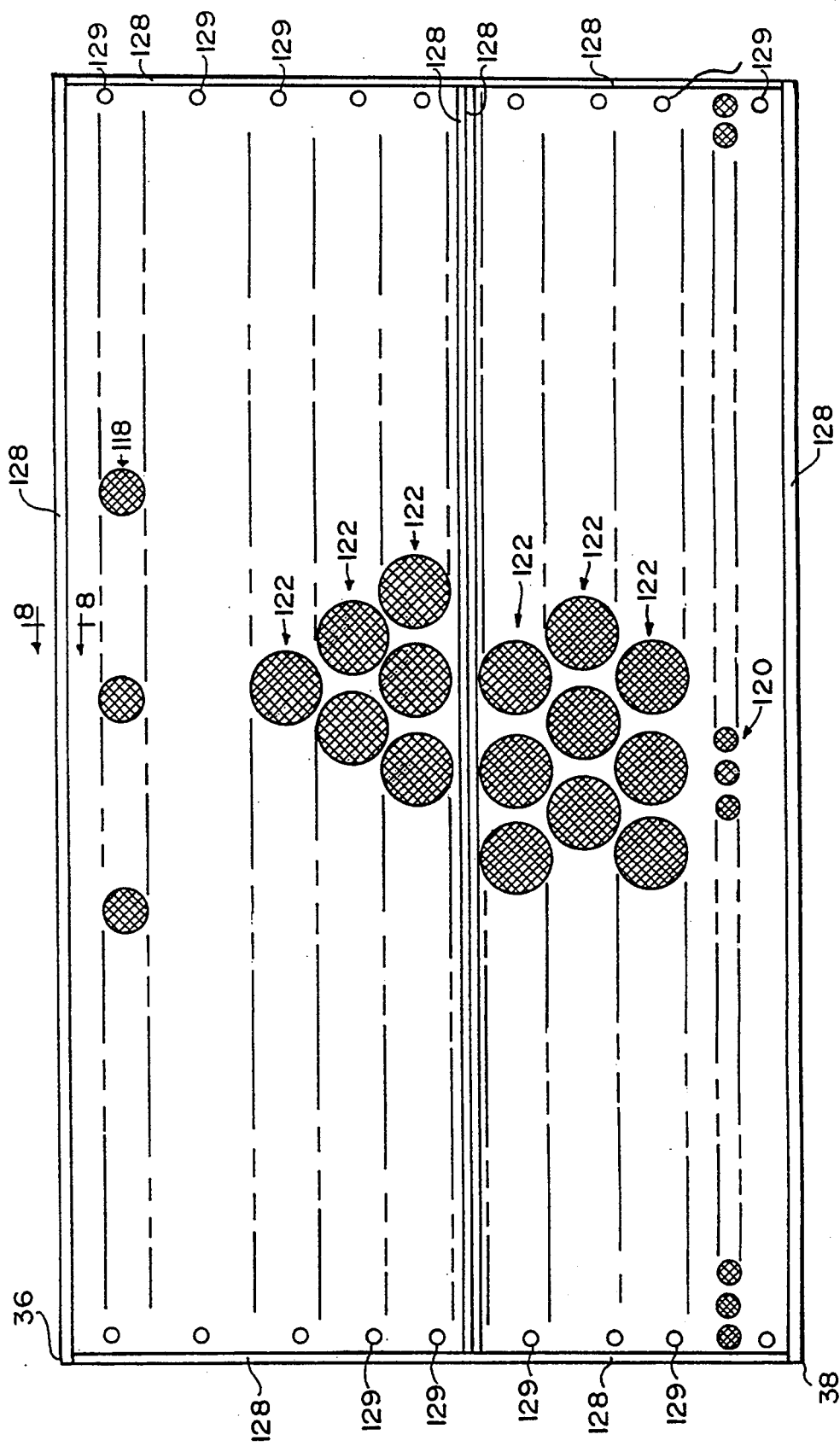
FIG. 7 is a plan view of a mesh-backing sheet assembly by itself apart from the strainer of the previous FIGS.
Figure 8:
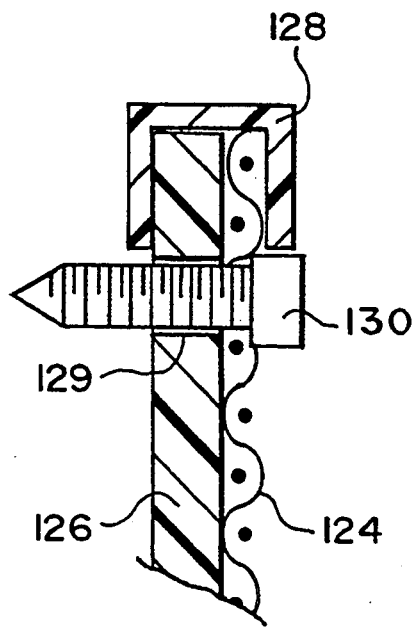
FIG. 8 is a fragmentary cross sectional view, on an enlarged scale, in the direction of arrows 8—8 in FIG. 7.

The other axial end is journaled by an arrangement that comprises a number of discs. This arrangement is shown on a larger scale in FIG. 5, and further includes an end cap 48 and a flange 50 which are fitted to the end of supply pipe 26 and via which the weight of rotary portion 30 is transmitted onto central core 22. A circular annular end cap 52 provides a closure for the lower axial end of suction pipe 28, but has an I.D. 54 that allows supply pipe 26 to pass through. Four identical circular annular discs 56, 58, 60, and 62 form a stack that is disposed against the outer face of end cap 52 and that has an I.D. allowing supply pipe 26 to pass through. Another stack of two identical circular annular discs 66 and 68 is fastened by screws 70 to the outer face of disc 42 so as to be concentric with disc 42 and coaxial with axis 24. The I.D. of this latter two-disc stack is equal to that of disc 42, and just slightly larger than the O.D. of the former four-disc stack. The drawing FIG. 5 shows that disc 42 is actually two individual discs 42A and 42B that are in face-to-face contact. In this way, all discs 52, 56, 58, 60, 62, 66, 68, 42A, and 42B may be fabricated from the same thickness stock.

Three further circular annular discs 74, 76, and 78 are also employed in the arrangement. They have I.D.s that allow them to just fit over supply pipe 26. Disc 74 extends radially outwardly from the supply pipe to fully cover the four-disc stack and radially overlap the radially inner margin of the two-disc stack. Disc 78 is the same size as disc 74 and is concentrically fastened by means of screws 80 to flange 50 coaxial with axis 24. The smaller diameter disc 76 is sandwiched between discs 74 and 78. Flange 50 is also fastened to supply pipe 26 by a threaded fastener 82 that can be a set screw. End cap 48 is fastened to supply pipe 26 by a threaded fastener 84.

With this arrangement discs 56, 58, 60, and 62 form a stationary part and discs 42A, 42B, 66, and 68 a rotary part of a journal for journaling this axial end of rotary portion 30 on central core 22. The weight of the rotary portion is transmitted through to flange 50 via discs 74, 76, and 78 which in effect function as thrust washers or thrust bearings. The weight of suction pipe 28 is also transmitted through to flange 50 so that it is supply pipe 26 that supports the entire strainer 20 when the strainer is uprightly suspended in a body of water that is to be pumped.

For suspending the strainer in this way, and for purposes of moving the strainer, the upper end of supply pipe 26 is provided with a tee 86 and a pair of pipes 88 and 90 that extend from the tee at ninety degrees to axis 24 through respective holes 92, 94 diametrically opposite each other in the sidewall of suction pipe 28. Pipes 88 and 90 extend sufficiently outwardly from suction pipe 28 to be grasped by suitable handling equipment (not shown) for lifting, and to be suspended from a suitable suspension structure (not shown) when installed. The outer end of one of the pipes 88 and 90 is closed by a cap 96 leaving the outer end of the other pipe 88, 90 available for connection to a source of pressurized water (not shown) for operating strainer 20. Holes 92 and 94 are sized in relation to pipes 88 and 90 such that there is no axial play between pipes 26 and 28. This will prevent the four-disc stack that is fastened to cap 52 at the lower end of pipe 28 from being displaced upwardly a distance sufficient to come out of the I.D. of disc 42. Supply pipe 26 thus remains coaxial within suction pipe 28, and rotary portion 30 remains journaled on central core 22 unless strainer 20 is intentionally disassembled.

Suction pipe 28 comprises a discharge 98 that is for connection to a suction source (not shown) when strainer 20 is in use. The typical suction source is a pump that is driven by an electric motor. Discharge 98 is connected through a conduit (not shown) to the suction side of the pump. There is typically a tap at the pressure side (outlet) of the pump that is connected by a conduit (not shown) back to the uncapped one of pipes 88 and 90 to deliver pressurized water to supply pipe 26.

Suction pipe 28 further comprises an intake via which water enters after having been sucked through strainer screen assemblies 36, 38 and underlying apertures in main tube 34. This intake comprises a number of holes 100 extending through the sidewall of suction pipe 28 between end closure discs 40 and 42. In the illustrated embodiment of strainer, holes 100 are circular and arranged in several rows extending around the circumference of the suction pipe. They provide sufficient intake area for the particular diameter of suction pipe, yet do not impair the pipe's strength for the intended purpose of the pipe in the strainer. As can be seen in FIG. 1, the uppermost holes 100 do not extend upwardly beyond a level designated by the numeral 102.

Suction pipe 28 further comprises a vertical row of six additional, and smaller, circular holes 104. These holes 104 provide for a like number of straight branch supply pipes 106 to pass radially through suction pipe 28 from supply pipe 26 toward pipe-strainer screen combination 32. The inner ends of pipes 106 tap into holes in the sidewall of supply pipe 26. Nozzles 108 attach to the outer ends of pipes 106 and are aimed directly at combination 32.

Below the row of holes 104 and at ninety degrees to them, suction pipe 28 contains two additional holes 110 diametrically opposite each other. These holes 110 provide for two branch supply pipes 112 to pass through suction pipe 28 from supply pipe 26 toward combination 32. Unlike the straight branch supply pipes 106, each branch supply pipe 112 contains an elbow 114. The inner end of each pipe 112 is tapped into a corresponding hole in supply pipe 26 while the outer end contains a nozzle 116 that is aimed in a direction that has both a radial and a tangential component relative to axis 24.

When pressurized water is delivered to supply pipe 26, it is distributed to the branch pipes and emitted from the nozzles. As will become more apparent from the ensuing description, nozzles 116 are drive nozzles that serve to rotate rotary portion 30 while nozzles 108 are cleaning nozzles that serve to clean those portions of combination 32 through which water is sucked into the strainer.

Main pipe 34 is multi-apertured, comprising three distinct aperture, or hole, patterns in its sidewall. The uppermost pattern is a single row of breather holes 118. The lowermost pattern is a single row of drive holes 120. The axially intermediate pattern comprises multiple rows of holes 122.

Holes 120 are the smallest of the three and are circular holes that are of equal diameter and each of which is equidistant from its immediately circumferentially adjacent holes. Breather holes 118 are circular and somewhat larger in diameter than holes 120; they are also spaced farther apart from each other than are holes 120 from each other. Holes 122 are the largest diameter of all three, being circular holes arranged in six circumferentially extending rows. As may be seen, there exists some circumferential offset between each row of holes 122 and an immediately axially adjacent row. The presence of holes in pipe 34 does not impair its strength for its intended purpose in the strainer.

The centers of holes 122 in each of the six rows of holes 122 lie in a plane that is perpendicular to axis 24. A corresponding one of the six branch supply pipes 106 also lies in each plane, and the corresponding cleaning nozzle 108 is aimed along a radial in the plane toward combination 32.

Figure 2:
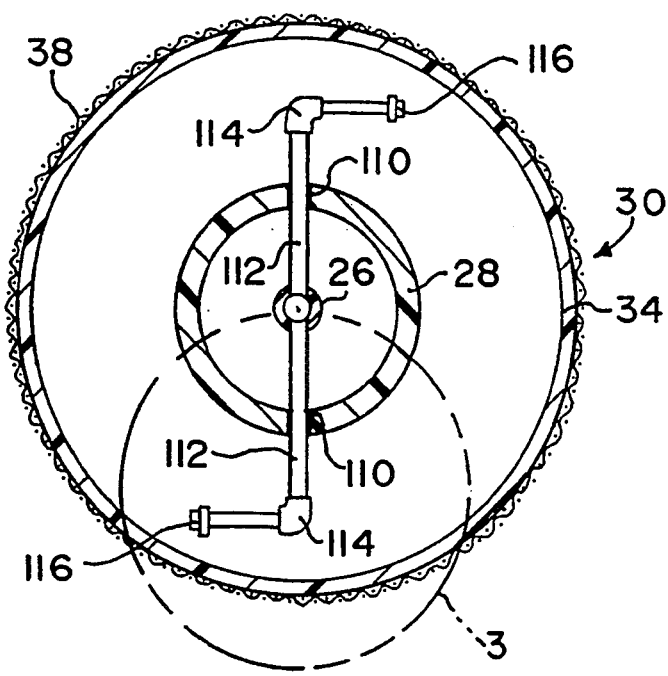
FIG. 2 is a transverse cross sectional view in the direction of arrows 2—2 in FIG. 1.
Figure 3:
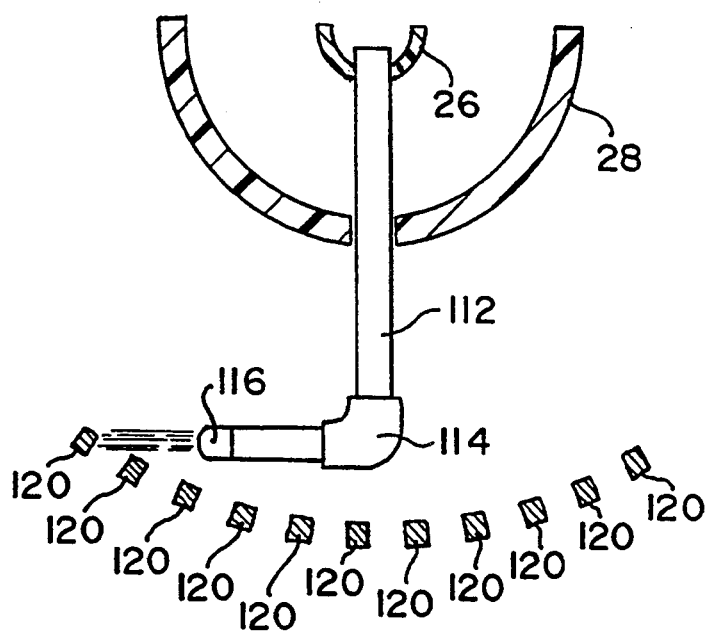
FIG. 3 is an enlarged view in circle 3 in FIG. 2.
Figure 4:
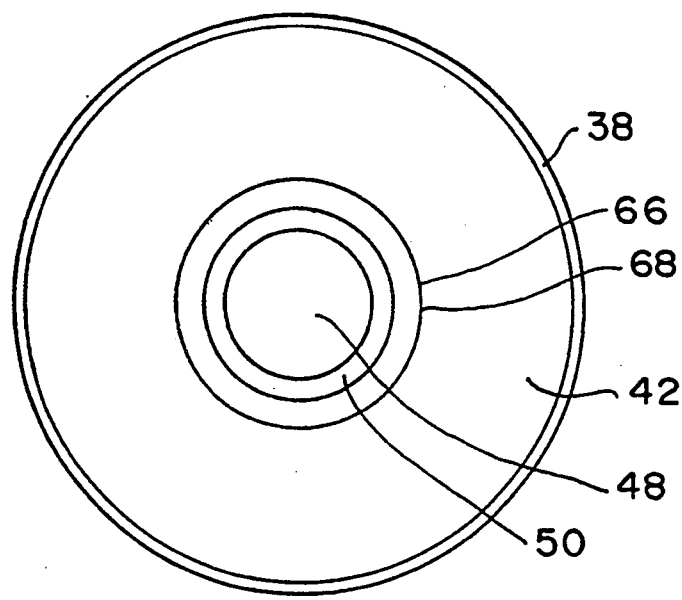
FIG. 4 is a full transverse end view in the direction of arrows 4-4 in FIG. 1.
Figure 6:
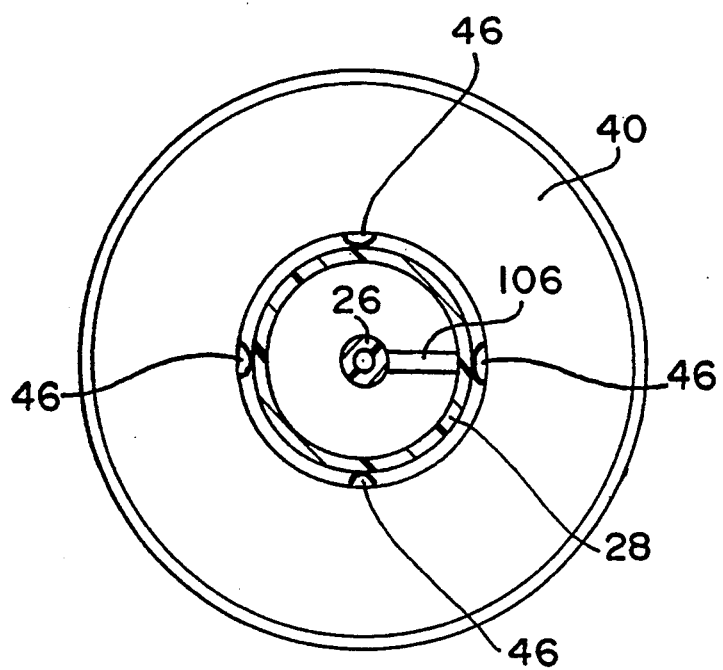
FIG. 6 is a transverse cross sectional view in the direction of arrows 6—6 in FIG. 1.

FIGS. 2 and 3 illustrate how drive nozzles 116 are arranged relative to drive holes 120. The centers of drive holes 120 lie in a plane that is perpendicular to axis 24. Branch supply pipes 112 also occupy this plane, and each nozzle 116 is aimed toward the circular row of drive holes 120, but in a direction that has both a radial and a tangential component. Main pipe 34 has a thickness that provides each drive hole 120 with a certain surface area for the hole's particular diameter. Since the drive holes are relatively small in diameter and closely spaced, pressurized water emitted from nozzles 116 will impact a portion of the surface area of one or more of the drive holes 120. The particular portion of the surface area impacted may be generally described as that portion which generally faces a drive nozzle 116, although it is to be appreciated that the impact is not normal to the particular surface area impacted.

The combination of the impacted surface area of the drive holes, the proximities of the drive holes to each other around the circumference of main pipe 34 and to drive nozzles 116, and the force with which water is emitted from the drive nozzles is such in relation to the resistance of rotary portion 30 to rotation on central core 22, that the rotational resistance is overcome, and hence rotation is imparted to rotary portion 30. Holes 120 therefore form a succession of reaction surfaces around the circumference of main pipe 34 that are repeatedly impacted by water from nozzles 116 to both start and to maintain the rotation. The impact force has both a tangential and a radial component, and it is the tangential component that imparts the rotation.

Because the reaction surfaces are parts of holes through the wall of main pipe 34, the impacting water from nozzles 116 can pass outwardly through the holes 120 after having impacted with a hole's wall surface. This is advantageous in achieving efficient use of the available force since the holes provide a very suitable means of escape for the water after impact. This drive arrangement is superior to turbine or paddle types of reaction surfaces because the reaction surfaces are in effect embedded in the sidewall of the tube, and unlike turbine blades or paddles, are not sticking out into the body of water where they would inherently create efficiency-reducing drag on the rotary motion. A still further advantage is that the holes can be created by drilling so that the need to fabricate and assemble blades or paddles to the rotary portion of a strainer is avoided.

Because rotation is efficiently imparted by the drive arrangement of the present invention, the cleaning function can be performed more efficiently as well. Thus cleaning nozzles 108 can emit water essentially radially, without a tangential component. This will produce maximum force for dislodging debris that may adhere to the outside of combination 32. As rotary portion 30 rotates, holes 122 pass in succession across cleaning nozzles 108. The water emitted from cleaning nozzles 108 dislodges adhering debris from screen that covers holes 122. Cleaning of the screen by means of cleaning nozzles 108 can be effective even if they are not aimed exactly radially. In other words, substantial radial aiming of the cleaning nozzles, even as much as twenty-two and one-half degrees from radial, is for most debris-removing purposes almost as fully effective as perfect radial aiming. It is the drive nozzles, not the cleaning nozzles, that rotate the rotary portion of the strainer. The cleaning nozzles by themselves remain incapable of rotating the rotary portion of the strainer.

Strainer 20 is intended to be only partially submerged in a body of water that is to be pumped. Accordingly, it is intended to be immersed to an extent where the surface of the body of water will lie between level 102 and breather holes 118. If a strainer were intended for total immersion, sealing of upper disc 40 to central core 22 would be used, and suitable sealing for this purpose is disclosed in the aforementioned commonly assigned patents.

Another important advantage of combination 32 is that it allows the strainer screen assemblies 36, 38 to be installed and removed without having to disassemble either of discs 40, 42 from main pipe 34. Each assembly 36, 38 is a combination of woven stainless steel wire mesh screen 124 and a plastic backing sheet 126 that are edged with a push-on U-shaped channel 128 to complete the sub-assembly that attaches by means of screws 130 to main pipe 34. Together the two assemblies 36, 38 cover the entire exterior of the sidewall of main pipe 34.

Each backing sheet 126 is rectangular and has a pattern of apertures corresponding exactly to the underlying apertures in main pipe 34. Each mesh screen 124 is rectangular, congruently matching the underlying backing sheet except for the backing sheet's apertures which the mesh is intended to cover. The mesh screen and backing sheet are superimposed in registry and channel 128 is pushed on over their perimeter margins.

Each assembly 36, 38 is assembled to main pipe 34 as follows. Backing sheet 126 contains a number of small clearance holes 129 for fastening screws 130. Holes 129 are located every several inches along the vertical margin. Main pipe 34 contains a matching pattern of small holes into which screws 130 thread. One of the vertical margins of an assembly 36, 38 is placed against the wall of pipe 34 and fastened to it. The assembly is then wrapped tightly around the full circumference of the pipe and fastened along its other vertical margin. This disposes strainer screen mesh in covering relation to all apertures in the sidewall of pipe 34. Channel 128 provides satisfactory sealing of the marginal edge portions of the assemblies to pipe 34. Whenever an assembly 36, 38 has to be removed for any reason, fasteners 130 are simply unscrewed and the assembly removed.

The various parts of strainer 20 are fabricated from readily available materials. The various pipes are fabricated from conventional PVC pipe. The various discs are plastic, such as polyethylene. Certain of the discs that bear significant loads are preferably UHMW plastic. The nozzles are metal.

In a specific embodiment of strainer 30, suction pipe 28 is nominal twelve inch PVC pipe, while pipe 24 is nominal twenty-seven inch PVC pipe having 0.548 inch wall thickness. The cleaning nozzles are V-jet nozzles (see FIG. 1). The drive nozzles are of a type that emit water as straight jets. When submerged, the nozzles' effectiveness is a function of distance. In order to have the desired effect on holes 120, nozzles 116 are disposed fairly close to pipe 34 as shown in FIG. 3. Nozzles 108 are disposed more interiorly so that they can be effective on the larger area of screen 124 overlying each hole 122. Backing sheet 126 is polyethylene having a one-eighth inch thickness, and channel 128 is conventional plastic that may contain a U-shaped metal insert for aiding retention on the superimposed marginal portions of the backing and screen. Holes 120 are one and one-eighth inch holes on substantially one and five-eighths inch centers. The straight jet nozzles are sized to flow fifteen gallons of water per minute at forty psi pressure. The end of each nozzle 116 is disposed approximately two inches from the center of a hole 120 when aimed at the center of the hole, and at the angular relationship shown in the drawings. Holes 122 are four and three-quarter inch holes. In each of the six rows of holes 122, the holes are located on five and three-eights inch centers. In each assembly 36, 38, the vertical dimension between a plane passing through the centers of the holes 122 in one row and a plane passing through the centers of the holes 122 in the next row is five inches, and the holes in one row are circumferentially offset from those in the next row.

While it is possible for the strainer to be assembled in several different steps, it should be mentioned that the rotary portion 30 cannot be assembled as a unit into the strainer. Rather, disc 42 may first be assembled by itself onto the central core 22, then pipe 34 assembled to disc 42, and finally disc 40 assembled to pipe 34. Thereafter pipes 88 and 90 can be passed through holes 92 and 94 and threaded into tee 86. In a submerged version where holes 92 and 94 would be below the surface of the water, they should be sealed in a leak-proof fashion to pipes 88 and 90. A version that is always intended to be submerged could also omit the breather holes 118.

Because the illustrated strainer is not intended to be fully submerged, there is no seal between the I.D. of disc 40 and the O.D. of suction pipe 28. If the strainer were to be fully submerged, a suitable seal would be provided, as mentioned earlier. The arrangement of discs at the lower end of the strainer provides suitable sealing.

Figure 9:
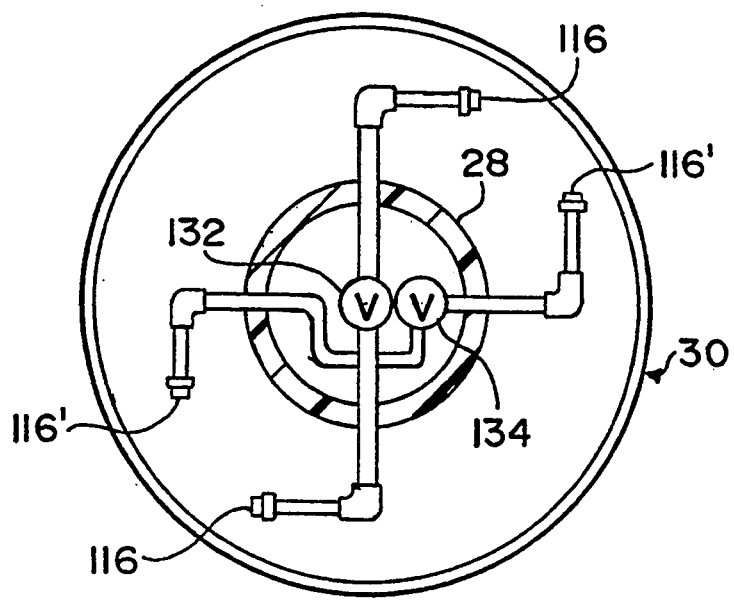
FIG. 9 is a view in the same direction as that of FIG. 2, but depicting another embodiment.

FIG. 9 discloses a modified form of drive which has a bidirectional capability. In addition to the two drive nozzles 116, there is a second set of drive nozzles 116' that are at ninety degrees to the first set 116 about axis 24. Nozzles 116' are symmetrically opposite nozzles 116, and only one set of nozzles is operated at a time. When set 116 is operated, rotary portion 30 turns as described earlier. However when set 116' is operated, the rotary portion turns in the opposite direction. Selection of a nozzle set is controlled by suitable valve means, such as a pair of solenoid valves 132,134 that are arranged to control the flow from supply pipe 26 to the two nozzle sets. When solenoid valve 132 is operated, set 116 is selected. When solenoid 134 is operated, set 116' is selected.

The ability to rotate in either direction may be advantageous at certain times. For example, if any portion of the rotary portion 30 were to have an interference with a portion of the central core 22 that would interfere with the rotation, the strainer could be operated in an oscillatory manner by reversing just before the obstruction would otherwise be encountered. A suitable sensor, such as limit switch means could be used to control the operation of the solenoid valves in that case. Another possibility would be to simply use a timer to periodically reverse the rotation, and where no obstructional situation exists in the strainer, a timer could be used to reverse the rotation at desired time intervals.

Figure 10:
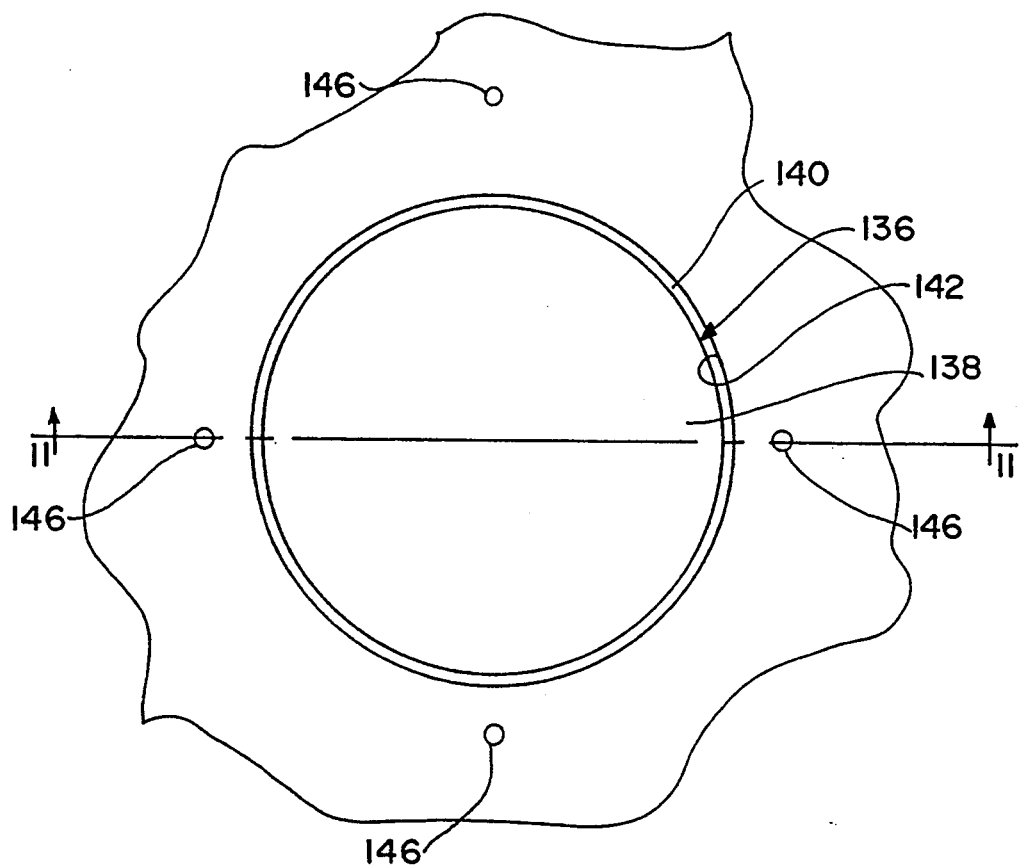
FIG. 10 is a fragmentary plan view of a modification that provides an additional feature.
Figure 11:
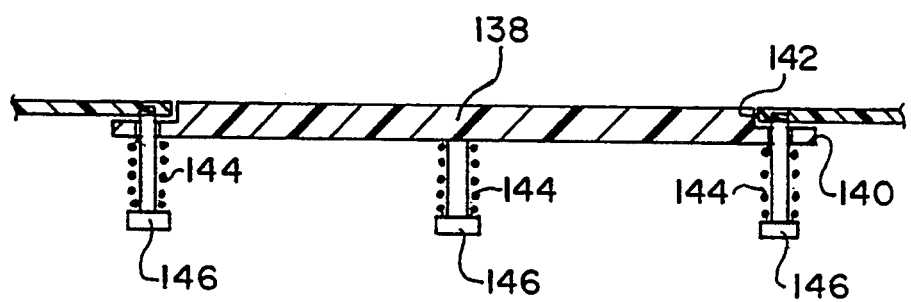
FIG. 11 is a slightly enlarged fragmentary cross-section in the direction of arrows 11—11 in FIG. 10.

The feature that is illustrated by FIGS. 10 and 11 is in the nature of a relief valve 136. It is essentially a valve that is mounted in an end closure disc 40, 42, and that remains closed unless an excessive vacuum is drawn within the strainer that would incipiently collapse the screen through the apertures in pipe 34. Prior to such screen collapse, the relief valve would open to provide a parallel flow path into the interior of the strainer. Even though that parallel flow path is unscreened, a collapse of the screen into the apertures of pipe 34 would create unscreened zones, and by providing the relief valve, at least the screen should be protected, even though an unscreen opening is provided into the interior of the strainer when the relief valve opens. The relief valve comprises a circular disc 138 having a flange 140 that fits in a complementary-shaped hole 142 in one of the end closure discs. Disc 138 is spring-biased closed by a number of springs 144 that are supported on guides 146 that attach and guide disc 138 on the end closure disc. When excessive vacuum exists on the interior of the strainer relative to its exterior, disc 138 opens hole 142. Depending on the size of the strainer, one or more relief valves 136 may be provided on a strainer, but in any event the relief valve(s) is (are) designed to open at a certain pressure differential between the interior and the exterior of the strainer.

One of the illustrated constructional features comprises the outer margin of the end closure discs slightly overlapping main pipe 34. This allows the assemblies 36, 38 to fit flush with and between the end closure discs. Another constructional feature involves making the vertical sections of channel 128 with a contrasting color to that of the backing sheets 126 for the purpose of providing a marker that may serve to make the rotation of the strainer more noticeable to an observer viewing the submerged strainer.

While a presently preferred embodiment of the invention has been illustrated and described, it should be appreciated that principles of the invention are applicable to other embodiments within the scope of the following claims.

What is claimed is:

1. A self-cleaning rotary strainer for connection to the suction side of a pump and insertion into a body of debris-containing liquid to prevent debris in the liquid from being sucked into the pump, said strainer comprising a central core having an axis, said central core comprising a suction pipe and a supply pipe, said suction pipe comprising an intake and a discharge at spaced locations along its length, said discharge serving to communicate said suction pipe to the pump and said intake serving to communicate said suction pipe to the body of liquid so that when the pump is operated, liquid is sucked into said suction pipe via said intake, conveyed through said suction pipe, and discharged from said suction pipe via said discharge, rotary strainer means for straining debris from liquid before the liquid is sucked into said intake, said rotary strainer means comprising a cylindrical main pipe coaxial with said axis radially outwardly of said suction pipe and having a sidewall that is open at opposite axial ends and that contains multiple apertures extending between radially inner and radially outer surfaces of said sidewall, means mounted on said main pipe, including journal means and strainer screen means, for journaling said rotary strainer means on said central core for rotation about said axis and for straining debris from liquid that passes through said apertures prior to entering said intake, said strainer screen means being disposed on said main pipe in covering relation to said apertures to allow liquid, but not debris, to pass through said apertures, said supply pipe supplying pressurized liquid to both clean and rotate said rotary strainer means, branch supply pipes extending from said supply pipe to convey pressurized liquid to first and second nozzle means that are aimed toward said cylindrical main pipe's sidewall, said first nozzle means being aimed substantially radially as viewed along said axis such that pressurized liquid emitted from said first nozzle means is incapable of rotating said rotary strainer means, said second nozzle means being aimed toward a circumferential succession of certain ones of said apertures such that pressurized liquid emitted from said second nozzle means is reacted against surface portions of said certain ones of said apertures with a component of force that is tangential to said axis and sufficiently large to rotate said rotary strainer means, said first nozzle means being aimed such that, as said rotary strainer means rotates, pressure liquid emitted from said first nozzle means passes through certain others of said apertures to dislodge debris from said strainer screen means where said strainer screen means is in covering relation to said certain others of said apertures.

2. A self-cleaning rotary strainer as set forth in claim I in which said certain others of said apertures are disposed as a series of rows extending circumferentially around said cylindrical main pipe and said certain ones of said apertures are disposed as a single row extending circumferentially around said cylindrical main pipe.

3. A self-cleaning rotary strainer as set forth in claim 2 in which said certain ones of said apertures are disposed on more closely circumferentially spaced centers in said single row as measured angularly about said axis than are said certain other of said apertures in any of said series of rows.

4. A self-cleaning rotary strainer as set forth in claim 3 in which said apertures are circular in shape.

5. A self-cleaning rotary strainer as set forth in claim 4 in which said strainer screen means comprises a single sheet of screen that is disposed circumferentially around said main pipe in covering relation to said certain ones of said apertures and in covering relation to at least some of said certain others of said apertures.

6. A self-cleaning rotary strainer as set forth in claim 5 in which said strainer means further comprises a backing sheet that is disposed face-to-face with said sheet of screen and that contains apertures that are in registry with those apertures in said cylindrical main pipe that are covered by said strainer screen means.

7. A self-cleaning rotary strainer as set forth in claim 6 in which said backing sheet and said sheet of strainer screen have matching margins, and further including U-shaped channel disposed over said matching margins, and in which fasteners pass through fastener apertures in said backing sheet that are located just interiorly of said channel for fastening said strainer screen means to said main cylindrical pipe, said channel providing sealing contact for said strainer screen means with said main cylindrical pipe.

8. A self-cleaning rotary strainer as set forth in claim 1 in which said second nozzle means comprises two nozzles disposed 180 degrees apart about said axis.

9. A self-cleaning rotary strainer as set forth in claim 8 in which said second nozzle means comprises two additional nozzles 180 degrees apart about said axis and at 90 degrees to said first two nozzles, said two additional nozzles being reversed from said first two nozzles, and means for selectively operating said first two nozzles and said two additional nozzles to provide for said rotary strainer means to be rotated in one direction about said axis when said first two nozzles are operated and in an opposite direction when said two additional nozzles are operated.

10. A self-cleaning rotary strainer as set forth in claim 1 in which said second nozzle means comprises at least one nozzle for rotating said rotary strainer means in one direction about said axis and at least one other nozzle for rotating said rotary strainer means in an opposite direction about said axis.

11. A self-cleaning rotary strainer as set forth in claim 1 in which said supply pipe extends coaxially through said suction pipe and said suction pipe has apertures that provide for said branch pipes to extend from said supply pipe to said first and second nozzle means.

12. A self-cleaning rotary strainer as set forth in claim 11 in which said means mounted on said main pipe comprises annular end discs extending from opposite axial ends of said main pipe radially inwardly toward said central core, said journal means being disposed proximate radially inner margins of said annular end discs.

13. A self-cleaning rotary strainer as set forth in claim 12 in which said journal means journals one of said annular end discs on said supply pipe and another of said annular end discs on said suction pipe.

14. A self-cleaning rotary strainer as set forth in claim 1 further including a row of breather apertures in said main pipe.

15. A self-cleaning rotary strainer as set forth in claim I in which said cylindrical main pipe comprises a PVC pipe and said apertures in said sidewall of said cylindrical main pipe are circular holes that have been created by radial drilling.

16. A self-cleaning rotary strainer for connection to the suction side of a pump and insertion into a body of debris-containing liquid to prevent debris in the liquid from being sucked into the pump, said strainer comprising a central core having an axis, said central core comprising suction pipe means and supply pipe means, said suction pipe means comprising an intake and a discharge at spaced locations along said axis, said discharge serving to communicate said suction pipe means to the pump and said intake serving to communicate said suction pipe means to the body of liquid so that when the pump is operated, liquid is sucked into said suction pipe means via said intake, conveyed through said suction pipe means, and discharged from said suction pipe means via said discharge, rotary strainer means for straining debris from liquid before the liquid is sucked into said intake, said rotary strainer means being journaled on said central core for rotation about said axis for straining debris from liquid prior to the liquid entering said intake, said supply pipe means supplying pressurized liquid to both clean and rotate said rotary strainer means, first nozzle means that is fluid-connected to said supply pipe means and aimed to dislodge debris from said rotary strainer means, and second nozzle means that is fluid-connected to said supply pipe means and aimed to rotate said rotary strainer means, said second nozzle means being aimed toward a circumferential succession of apertures in a circumferentially extending plastic wall means that is disposed on said rotary strainer means coaxial with said axis such that pressurized liquid emitted from said second nozzle means is reacted against surface portions of said apertures with a component of force that is tangential to said axis and sufficiently large to rotate said rotary strainer means.

17. A self-cleaning rotary strainer as set forth in claim 16 in which said circumferentially extending plastic wall means is a circular cylindrical plastic member.

18. A self-cleaning rotary strainer as set forth in claim 17 in which said circular cylindrical plastic member forms a sidewall of said rotary strainer means, and said rotary strainer means comprises strainer screen means disposed around the outside of said circular cylindrical plastic member in covering relation both to said apertures and to further apertures in said circular cylindrical plastic member toward which pressurized liquid from said first nozzle means is emitted to dislodge debris from those portions of said strainer screen means that are in registry with said further apertures.

19. A self-cleaning rotary strainer as set forth in claim 18 in which said first-mentioned apertures are disposed proximate one axial end of said rotary strainer means and said further apertures are disposed between the other axial end of said rotary strainer means and said first-mentioned apertures.

20. A self-cleaning rotary strainer for connection to the suction side of a pump and insertion into a body of debris-containing liquid to prevent debris in the liquid from being sucked into the pump, said strainer comprising a central core having an axis, said central core comprising suction pipe means and supply pipe means, said suction pipe means comprising an intake and a discharge at spaced locations along said axis, said discharge serving to communicate said suction pipe means to the pump and said intake serving to communicate said suction pipe means to the body of liquid so that when the pump is operated, liquid is sucked into said suction pipe means via said intake, conveyed through said suction pipe means, and discharged from said suction pipe means via said discharge, rotary strainer means for straining debris from liquid before the liquid is sucked into said intake, said rotary strainer means being journaled on said central core for rotation about said axis for straining debris from liquid prior to the liquid entering said intake, said supply pipe means supplying pressurized liquid to both clean and rotate said rotary strainer means by conveying pressurized liquid to nozzle means that dislodge debris from said rotary strainer means and rotate said rotary strainer means, at least one nozzle of said nozzle means being aimed to rotate said rotary strainer means in one direction about said axis, and at least another nozzle of said nozzle means being aimed to rotate said rotary strainer means in another direction about said axis, and control means for selectively operating said at least one nozzle and said at least another nozzle to select the direction of rotation of said rotary strainer means about said axis.

* * * * *